United States Patent
Wen et al.

(10) Patent No.: US 9,491,728 B2
(45) Date of Patent: Nov. 8, 2016

(54) METHOD AND DEVICE FOR IMPLEMENTING AUTOMATIC COMPENSATION FOR ASYMMETRIC DELAY OF 1588 LINK

(75) Inventors: Lin Wen, Shenzhen (CN); Junhui Zhang, Shenzhen (CN); Kai Chen, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 137 days.

(21) Appl. No.: 14/234,247

(22) PCT Filed: Aug. 7, 2012

(86) PCT No.: PCT/CN2012/079778
§ 371 (c)(1),
(2), (4) Date: Jan. 22, 2014

(87) PCT Pub. No.: WO2013/020499
PCT Pub. Date: Feb. 14, 2013

(65) Prior Publication Data
US 2014/0146811 A1    May 29, 2014

(30) Foreign Application Priority Data

Aug. 10, 2011 (CN) .......................... 2011 1 0228386

(51) Int. Cl.
*H04W 56/00* (2009.01)
*H04J 3/06* (2006.01)

(52) U.S. Cl.
CPC .......... *H04W 56/004* (2013.01); *H04J 3/0667* (2013.01); *H04W 56/0065* (2013.01)

(58) Field of Classification Search
None
See application file for complete search history.

(56) References Cited

U.S. PATENT DOCUMENTS

| 9,184,860 B2* | 11/2015 | Shen ..................... H04J 3/0658 |
| 2007/0147435 A1* | 6/2007 | Hamilton et al. ........... 370/503 |
| 2007/0147562 A1* | 6/2007 | Eidson ......................... 375/354 |

(Continued)

FOREIGN PATENT DOCUMENTS

| CN | 101594673 A | 12/2009 |
| CN | 101834712 A | 9/2010 |

(Continued)

OTHER PUBLICATIONS

International Search Report for PCT/CN2012/079778 dated Sep. 26, 2012.

(Continued)

*Primary Examiner* — Jenee Williams
(74) *Attorney, Agent, or Firm* — Ling Wu; Stephen Yang; Ling and Yang Intellectual Property

(57) ABSTRACT

A method and device for implementing a compensation for an asymmetry delay of a 1588 link are provided. The method comprises: measuring and calculating a value of an asymmetry delay of the 1588 uplink/downlink; performing an asymmetry delay compensation when the value of the asymmetry delay exceeds a set synchronization offset range; and continuing a normal 1588 time synchronization if the value of the asymmetry delay does not exceed the set synchronization offset range; and implementing the automatic compensation for the asymmetry delay of the 1588 link. The above-mentioned scheme can correct the asymmetry delay automatically, and ensure the quality of 1588 time synchronization.

11 Claims, 2 Drawing Sheets

(56) References Cited

U.S. PATENT DOCUMENTS

| | | | |
|---|---|---|---|
| 2008/0080562 A1* | 4/2008 | Burch et al. | 370/503 |
| 2009/0016475 A1 | 1/2009 | Rischar et al. | |
| 2009/0161744 A1* | 6/2009 | Smith et al. | 375/226 |
| 2010/0309932 A1* | 12/2010 | Diab | H04J 3/0682 370/503 |
| 2010/0329125 A1 | 12/2010 | Roberts et al. | |
| 2011/0035511 A1* | 2/2011 | Biederman | G04G 7/00 709/248 |
| 2011/0087803 A1* | 4/2011 | Sun | H04J 3/0673 709/248 |
| 2011/0170534 A1* | 7/2011 | York | H04J 3/0667 370/350 |
| 2011/0262133 A1* | 10/2011 | Yuan | H04J 3/0667 398/43 |
| 2011/0268097 A1* | 11/2011 | Agrawala | G01S 5/021 370/338 |
| 2012/0051374 A1* | 3/2012 | Obradovic et al. | 370/503 |
| 2012/0099432 A1* | 4/2012 | Bercovich et al. | 370/235 |
| 2012/0195256 A1* | 8/2012 | Khoury | H04W 56/0035 370/328 |
| 2012/0263195 A1* | 10/2012 | Li et al. | 370/510 |
| 2013/0182806 A1* | 7/2013 | Obradovic et al. | 375/356 |

FOREIGN PATENT DOCUMENTS

| | | | |
|---|---|---|---|
| CN | 102006157 A | 4/2011 | |
| EP | 1802014 A1 | 6/2007 | |
| WO | WO 2008151996 A1 * | 12/2008 | H04N 7/62 |
| WO | 2011079460 A1 | 7/2011 | |

OTHER PUBLICATIONS

Synchronization service in Carrier-Grade Ethernet environments, Dinh Thai Bui et al. Feb. 25, 2010; XP-002662902; The whole document.

An Enhanced IEEE 1588 Time Synchronization Algorithm for Asymmetric Communication Link using Block Burst Transmission. Sungwon Lee, Member,IEEE; Sep. 9, 2008; XP0011234346; pp. 687-789.

* cited by examiner

METHOD AND DEVICE FOR IMPLEMENTING AUTOMATIC COMPENSATION FOR ASYMMETRIC DELAY OF 1588 LINK

TECHNICAL FIELD

The present document relates to the 1588 clock network technology field, and in particular, to a method and device for implementing an automatic compensation for an asymmetry delay of a 1588 link.

BACKGROUND OF THE RELATED ART

With the high speed development of the 3rd Generation mobile communication technology (3G) network, the 1588 time synchronization protocol gets increasing attention and application in the communication network. The 1588 protocol is used by the domestic and foreign operators constantly to perform the time synchronization, to replace the use of the Global Positioning System (GPS) for the time synchronization progressively.

As shown in FIG. 1, in the 1588 time synchronization, the synchronous way is as follows: the following formulae can be obtained from FIG. 1:

$$A = t_1 - t_0 = \text{Delay} + \text{Offset}; \quad (1)$$

$$B = t_3 - t_2 = \text{Delay} - \text{Offset}; \quad (2)$$

and then the following formulae can be obtained according to the above (1) and (2):
a formula for Delay: Delay=(A+B)/2=((t1−t0)+(t3−t2))/2;
a formula for time offset: Offset=(A−B)/2=((t1−t0)−(t3−t2))/2.

Wherein, the above-mentioned formulae suppose that time delays for the uplink and downlink are equal. The foundation of the 1588 time synchronization is to require a symmetrical delay for the uplink/downlink transmission. If the uplink/downlink transmission has the asymmetry, that is, when the delays of the uplink and downlink transmissions are unequal, as shown in FIG. 2, in this case, the 1588 protocol is used to calculate the time offset, half of the error value of the asymmetry has not be counted into the offset value, thus the time offset can not be corrected accurately and the quality of the time synchronization is reduced. Under the situation that the asymmetry delay is critical, even it will result in that the time is unable to be synchronized ultimately.

At present, mostly, the specialized test instruments are used to measure the delays of the 1588 uplink and downlink in the prior art. The actual value of the asymmetry delay is measured, and then the compensation is performed on the asymmetry delay through the 1588 asymmetry delay compensation method. However not only the method consumes the manpower and materials, but also the device cannot measure the actual asymmetry delay automatically when the link changes, thus reducing the quality of the time synchronization.

SUMMARY OF THE INVENTION

The technical problem to be solved by the present document is to provide a method and device for implementing an automatic compensation for an asymmetry delay of a 1588 link, which can correct the asymmetry delay automatically and ensure the quality of the 1588 time synchronization.

In order to solve the above-mentioned technical problem, the present document provides a method for implementing a compensation for an asymmetry delay of a 1588 link, comprising:
measuring and calculating a value of an asymmetry delay of 1588 uplink/downlink; and
performing an asymmetry delay compensation when the value of the asymmetry delay exceeds a set synchronization offset range; and continuing a normal 1588 time synchronization if the value of the asymmetry delay does not exceed the set synchronization offset range; and implementing the automatic compensation for the asymmetry delay of the 1588 link.

Preferably, said measuring and calculating a value of an asymmetry delay of 1588 uplink/downlink comprises:
starting a 1588 time synchronization calculation;
calculating a time offset for the first time, and correcting the time offset according to actual delays of the 1588 uplink and downlink;
suspending the calculation and correction of the time offset, and recording a time stamp of the 1588 time synchronization, comprising: a T1 time stamp for sending a Sync message, a T2 time stamp for receiving the Sync message, a T3 time stamp for sending a delay request (Delay_req) message, and a T4 time stamp for receiving the Delay_req message;
calculating the asymmetry delay according to a formula: D1−D2=((T2−T1)−(T4−T3))/2;
wherein, D1 is a delay of the downlink, and D2 is a delay of the uplink.

Preferably, said correcting the time offset according to actual delays of the 1588 uplink and downlink refers to that:
a formula for calculating the time offset in a 1588 protocol is: Offset=((T2−T1)−(T4−T3))/2;
a formula for calculating the time offset considering the actual delays of the 1588 uplink and downlink is: Offset=((T2−T1)−(T4−T3))/2+(D2−D1)/2; and
according to the above-mentioned two formulae, the time offset after correcting the time offset for the first time can be obtained as: Offset=−(D2−D1)/2=(D1−D2)/2.

Preferably, said performing an asymmetry delay compensation refers to: performing the asymmetry delay compensation by using an asymmetry correction way of the 1588 protocol.

Preferably, the value of the asymmetry delay of the 1588 uplink/downlink is measured and calculated periodically according to a configured asymmetry measurement period.

In order to solve the above-mentioned technical problem, the present document provides a system for implementing a compensation for an asymmetry delay of a 1588 link, comprising:
an asymmetry measurement module, configured to measure and calculate a value of an asymmetry delay of 1588 uplink/downlink; and
an asymmetry compensation module, configured to perform an asymmetry delay compensation when the value of the asymmetry delay exceeds a set synchronization offset range; and implement the automatic compensation for the asymmetry delay of the 1588 link.

Preferably, the system further comprises:
a device synchronization precision configuration module, configured to: configure a 1588 time synchronization offset range of the device, that is, the time synchronization precision of the device without the asymmetry delay of the 1588 uplink/downlink; and a 1588 protocol processing module, configured to: configure, send and receive the 1588 protocol, process a time stamp, and calculate the time offset.

Preferably, the 1588 protocol processing module is configured to calculate the time offset for the first time after starting a 1588 time synchronization calculation, and correct the time offset according to actual delays of the 1588 uplink and downlink; suspend the calculation and correction of the time offset, and record a time stamp of the 1588 time synchronization, comprising: a T1 time stamp for sending a Sync message, a T2 time stamp for receiving the Sync message, a T3 time stamp for sending a delay request (Delay_req) message, and a T4 time stamp for receiving the Delay_req message; and the asymmetry measurement module is configured to calculate the asymmetry delay according to a formula: $D1-D2=((T2-T1)-(T4-T3))/2$; wherein, D1 is a delay of the downlink, and D2 is a delay of the uplink.

Preferably, the system further comprises:

an asymmetry measurement period configuration module, configured to configure an asymmetry measurement period; and the asymmetry measurement module is configured to measure and calculate the value of the asymmetry delay of the 1588 uplink/downlink periodically according to the asymmetry measurement period configured by the asymmetry measurement period configuration module.

Compared with the related art, the embodiment of the present document provides a simple and effective computing method on the basis of the existing 1588 time synchronization algorithm, which measures the asymmetry delay of the time synchronization of the 1588 uplink/downlink automatically and solves the problem that it is measured through the special tester by manpower and it is required to measure again when the link changes, etc.

BRIEF DESCRIPTION OF DRAWINGS

The accompanying drawings described herein are used to provide further understanding for the present document and constitute a part of the present application. The illustrated embodiments of the present document and the description thereof are used to explain the present document, rather than constituting an inappropriate limitation on the present document. Wherein.

PREFERRED EMBODIMENTS OF THE INVENTION

The method for implementing an automatic compensation for an asymmetry delay of the 1588 uplink/downlink of the present embodiment includes the following steps:

in step A, the device time synchronization offset threshold is configured;

in step B, a 1588 time synchronization calculation is started;

in step C, the time offset value (Offset) is calculated for the first time, and the time offset is corrected according to an actual link delay, and the calculation and correction of the 1588 time synchronization offset is suspended;

in step D, a time stamp of the 1588 time synchronization is recorded;

in step E, the asymmetry delay is calculated according to a formula: $D1-D2=((T2-T1)-(T4-T3))/2$;

in step F, an asymmetry delay compensation is performed automatically by using the 1588 asymmetry delay compensation way if it is found that the asymmetry delay (D1-D2) exceeds a device time synchronization offset range; or else, step H is executed;

in step H, in the case that there is no asymmetry delay, it is to continue the normal 1588 time synchronization and wait for the next asymmetry measurement period.

In order to make the objective, technical scheme and advantage of the present document clearer and more obvious, the embodiment of the present document is described in detail with reference to the accompanying drawings hereinafter. It should be illustrated that, in the case of not conflicting, the embodiments in the present application and features in these embodiments can be combined with each other.

Embodiment One

Figure 1:
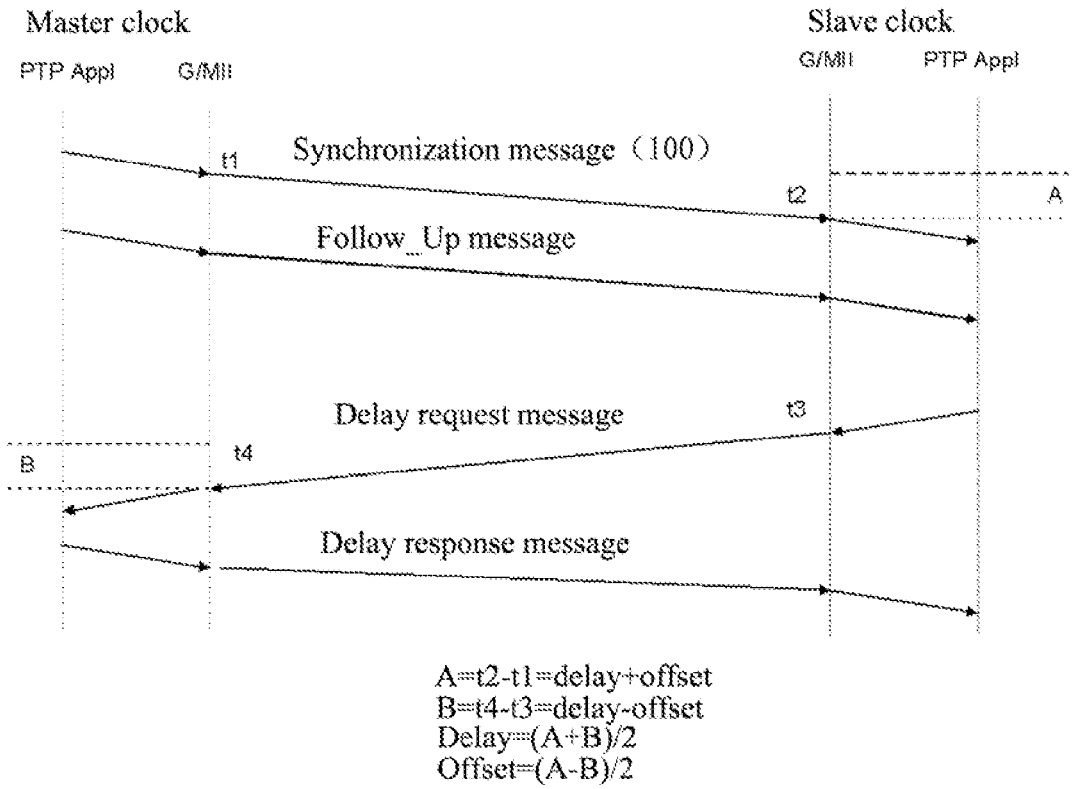
FIG. 1 is a flow chart of calculating a time offset through the 1588 protocol.
Figure 2:
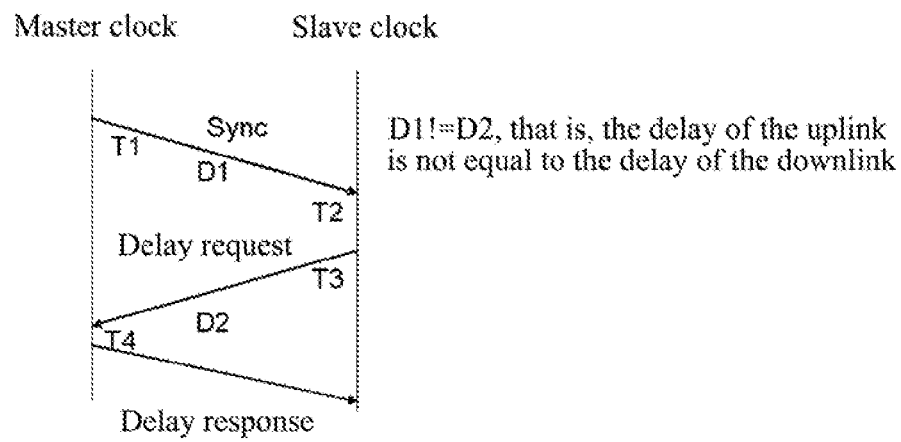
FIG. 2 is a diagram of an offset occurring in a time synchronization of the 1588 protocol influenced by an asymmetry delay.

Combining with FIG. 2, in the 1588 time synchronization protocol, the formula of the time offset is: $\text{Offset}=((T2-T1)-(T4-T3))/2$, the assumption of this formula is that the uplink and downlink delays are equal.

If considering the uplink delay (D2) and the downlink delay (D1), then the actual formula is: $\text{Offset}=((T2-T1)-(T4-T3))/2+(D2-D1)/2$.

So, the difference between the time offsets calculated by those two is $(D2-D1)/2$.

Combining with the above-mentioned contents, the method for implementing an automatic compensation for an asymmetry delay of the 1588 uplink/downlink of the present embodiment includes the following steps:

in step 1, the time synchronization offset range, that is, the precision of the device time synchronization in the case that there is no asymmetry delay, is configured; and the unit is nanosecond;

in step 2, a 1588 slave clock is configured, and the time of a master clock is synchronized;

in step 3, the 1588 time synchronization protocol runs, and the Offset is calculated;

in step 4, the time of the slave clock is corrected according to the value of the Offset;

in step 5, it is to stop correcting the time of the slave clock according to the value of the Offset and save a T1 time stamp for sending the Sync message and a T2 time stamp for receiving the Sync message; storing a T3 time stamp for sending a Delay_req message, and a T4 time stamp for receiving the Delay_req message;

in step 6, according to the 1588 time synchronization formula, there are: $T2-T1=D1+\text{Offset}$, $T4-T3=D2-\text{Offset}$;

after correcting the time offset for the first time, $\text{Offset}=-(D2-D1)/2=(D1-D2)/2$; and that formula is substituted into the above-mentioned formula: $T2-T1=(3D1-D2)/2, T4-T3=(3D2-D1)/2$;

in step 7, from the above-mentioned formula, it can be derived that, $D1-D2=(T2-T1)-(T4-T3))/2$;

in step 8, in view of the restriction of the hardware, and according to the synchronization precision of the device itself, when the difference between the values of the asymmetry delay D1−D2 exceeds the set synchronization offset range, then it is thought that there is an asymmetry delay, and the asymmetry delay compensation is performed by using the asymmetry correcting method in the 1588 protocol.

Embodiment Two

Figure 3:
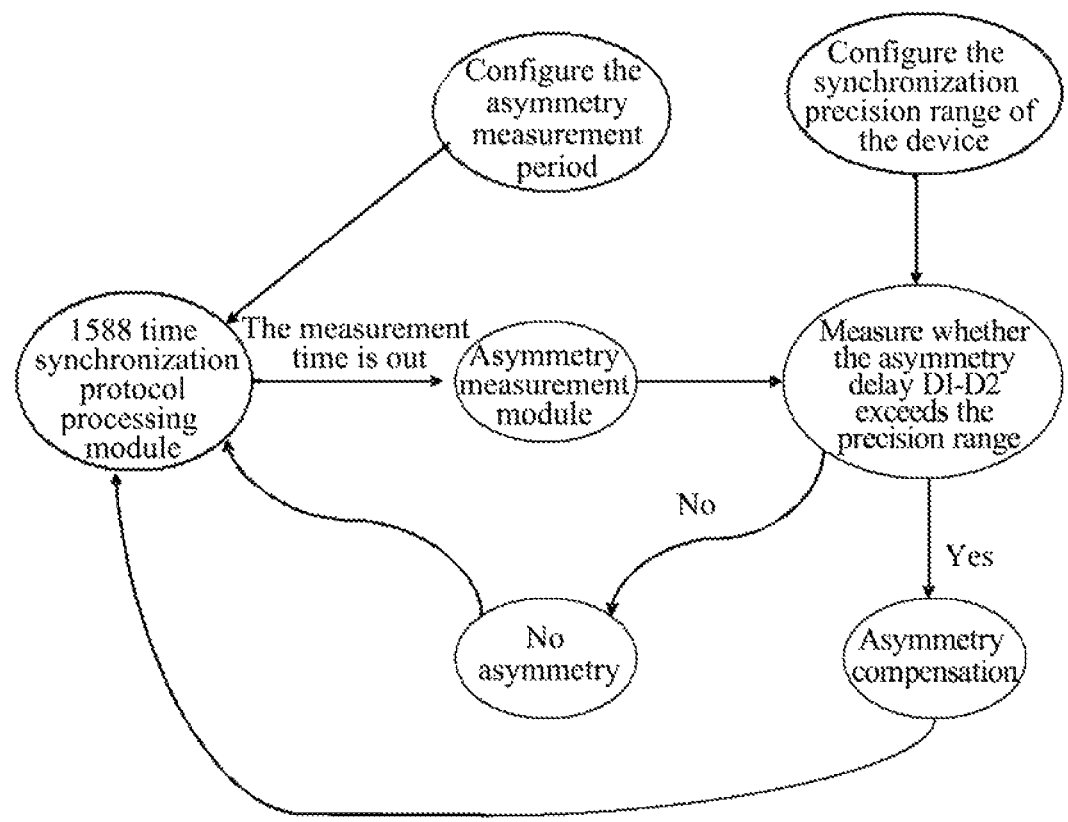
FIG. 3 is a flow chart of automatically measuring an asymmetry delay of the 1588 uplink/downlink according to an embodiment of the present document.

As shown in FIG. 3, a system for implementing an automatic compensation for an asymmetry delay of the 1588 uplink/downlink according to an embodiment of the present document mainly includes the following modules:

a device synchronization precision configuration module, mainly responsible for: configuring a 1588 time synchronization offset range of the device, that is, the time synchronization precision of the device in the case of no asymmetry delay of the 1588 uplink/downlink;

an asymmetry measurement period configuration module, mainly responsible for: configuring an asymmetry measurement period;

a 1588 protocol processing module, mainly responsible for: configuring, sending and receiving the 1588 protocol, processing a time stamp, and calculating the time offset and link delay;

an asymmetry measurement module, mainly responsible for: measuring the value of the asymmetry delay of the 1588 uplink/downlink periodically according to the configured asymmetry measurement period;

an asymmetry compensation module, mainly responsible for: configuring the asymmetry delay for compensation of the 1588 uplink/downlink;

an asymmetry measurement module, used for: measuring and calculating a value of an asymmetry delay of the 1588 uplink/downlink; and wherein the asymmetry compensation module is used for: performing an asymmetry delay compensation when the value of the asymmetry delay exceeds a set synchronization offset range.

Further, the 1588 protocol processing module is used for calculating the time offset for the first time after starting a 1588 time synchronization calculation, and correcting the time offset according to actual delays of the 1588 uplink and downlink; suspending the calculation and correction of the time offset, and recording a time stamp of the 1588 time synchronization, including: a T1 time stamp for sending a Sync message, a T2 time stamp for receiving the Sync message, a T3 time stamp for sending a delay request (Delay_req) message, and a T4 time stamp for receiving the Delay_req message; and the asymmetry measurement module is used for calculating the asymmetry delay according to a formula: $D1-D2=((T2-T1)-(T4-T3))/2$.

Specifically, the implementation of the automatic compensation for the asymmetry delay of the 1588 uplink/downlink according to the present embodiment is as follows:

in step 301, the precision range of the time synchronization of the device is configured in the case that there is no asymmetry delay through the device synchronization precision configuration module;

in step 302, configuring the asymmetry measurement period is configured through the asymmetry measurement period configuration module;

in step 303, the time offset is calculated through the 1588 protocol processing module;

in step 304, the asymmetry delay of the time synchronization of the 1588 uplink/downlink is calculated regularly through the asymmetry measurement module;

in step 305, the asymmetry delay is automatically compensated through the asymmetry compensation module.

The above description is only the preferred embodiments of the present document and is not intended to limit the present document. The present document can have a variety of other embodiments. Those skilled in the art can make the corresponding modifications and variations according to the present document without departing from the spirit and essence of the present document. And all of these modifications or the variations should be embodied in the scope of the appending claims of the present document.

Obviously, it can be understood by those skilled in the art that each module or each step above-mentioned in the present document can be implemented by the universal calculating apparatus, and they can be integrated in a single calculating apparatus, or distributed in the network made up by a plurality of calculating apparatus. Alternatively, they can be implemented by the executable program codes of the calculating apparatus. Accordingly, they can be stored in the storage apparatus and implemented by the calculating apparatus, and in some situations, the shown or described steps can be executed in a different order from here, or they are made into each integrated circuit module respectively, or a plurality of modules or steps therein are made into the single integrated circuit module to be implemented. In this way, the present document is not limit to any specific form of the combination of the hardware and software.

INDUSTRIAL APPLICABILITY

Because the embodiment of the present document is realized on the basis of the existing hardware device without increasing the extra cost, and also the cost increase of the software is not big, while the problem of the asymmetry of the 1588 time synchronization is solved effectively, and the cost of manpower and materials for opening the 1588 time synchronization project is saved greatly.

What we claim is:

1. A method for implementing a compensation for an asymmetry delay of a 1588 link, comprising:

measuring and calculating a value of an asymmetry delay of 1588 uplink and downlink by a 1588 time synchronization protocol processing integrated circuit module; and performing, by an asymmetry measurement integrated circuit module, an asymmetry delay compensation when the value of the asymmetry delay exceeds a set synchronization offset range; and continuing a normal 1588 time synchronization if the value of the asymmetry delay does not exceed the set synchronization offset range; and implementing an automatic compensation for the asymmetry delay of the 1588 link.

2. The method according to claim 1, wherein, said measuring and calculating a value of an asymmetry delay of 1588 uplink and downlink comprises:

starting a 1588 time synchronization calculation;

calculating a time offset for a first time, and correcting the time offset according to actual delays of the 1588 uplink and downlink;

suspending the calculation and correction of the time offset, and recording a time stamp of the 1588 time synchronization calculation, comprising: a T1 time stamp for sending a Sync message, a T2 time stamp for receiving the Sync message, a T3 time stamp for sending a delay request (Delay_req) message, and a T4 time stamp for receiving the Delay_req message;

calculating the asymmetry delay according to a formula: $D1-D2=((T2-T1)-(T4-T3))/2$;

wherein, D1 is a delay of the downlink, and D2 is a delay of the uplink.

3. The method according to claim 2, wherein, said correcting the time offset according to actual delays of the 1588 uplink and downlink refers to that:

a formula for calculating a time offset in a 1588 protocol is: $\text{Offset}=((T2-T1)-(T4-T3))/2$;

a formula for calculating a time offset considering the actual delays of the 1588 uplink and downlink is: $\text{Offset}=((T2-T1)-(T4-T3))/2+(D2-D1)/2$; and according to the formulae for calculating a time offset, a time offset after correcting the time offset for the first time can be obtained as: $\text{Offset}=-(D2-D1)/2=(D1-D2)/2$.

4. The method according to claim 1, wherein, said correcting the time offset according to actual delays of the 1588 uplink and downlink comprises:

a formula for calculating a time offset in 1588 protocol is: $\text{Offset}=((T2-T1)-(T4-T3))/2$;

a formula for calculating a time offset considering the actual delays of the 1588 uplink and downlink is: $\text{Offset}=((T2-T1)-(T4-T3))/2+(D2-D1)/2$; and according to the formulae for calculating a time offset, a time offset after correcting the time offset for the first time can be obtained as: $\text{Offset}=-(D2-D1)/2=(D1-D2)/2$.

5. The method according to claim 1, wherein, said performing an asymmetry delay compensation refers to: performing the asymmetry delay compensation by using an asymmetry correction way of a 1588 protocol.

6. The method according to claim 1, wherein, the value of the asymmetry delay of the 1588 uplink and downlink is measured and calculated periodically according to a configured asymmetry measurement period.

7. A system for implementing a compensation for an asymmetry delay of a 1588 link, comprising:

a processor and a storage device coupled to the processor which stores processor-executable program that comprises following modules, wherein an asymmetry measurement integrated circuit module, configured to measure and calculate a value of an asymmetry delay of 1588 uplink and downlink; and an asymmetry compensation module, to perform, by the processor, an asymmetry delay compensation when the value of the asymmetry delay exceeds a set synchronization offset range; and implement an automatic compensation for the asymmetry delay of the 1588 link.

8. The system according to claim 7, further comprising:

a device synchronization precision configuration module, configured to: configure a 1588 time synchronization offset range of a device, that is, a time synchronization precision of the device without the asymmetry delay of the 1588 uplink and downlink; and a 1588 protocol processing module, configured to: configure, send and receive the 1588 protocol, process a time stamp, and calculate a time offset.

9. The system according to claim 8, wherein:

the 1588 protocol processing module is configured to calculate a time offset for a first time after starting a 1588 time synchronization calculation, and correct the time offset according to actual delays of the 1588 uplink and downlink; suspend the calculation and correction of the time offset, and record a time stamp of the 1588 time synchronization calculation, comprising: a T1 time stamp for sending a Sync message, a T2 time stamp for receiving the Sync message, a T3 time stamp for sending a delay request (Delay_req) message, and a T4 time stamp for receiving the Delay_req message; and the asymmetry measurement integrated circuit module is configured to calculate the asymmetry delay according to a formula: $D1-D2=((T2-T1)-(T4-T3))/2$; wherein, D1 is a delay of the downlink, and D2 is a delay of the uplink.

10. The system according to claim 8, further comprising:

an asymmetry measurement period configuration module, configured to configure an asymmetry measurement period; and wherein, the asymmetry measurement integrated circuit module is configured to measure and calculate the value of the asymmetry delay of the 1588 uplink and downlink periodically according to the asymmetry measurement period configured by the asymmetry measurement period configuration module.

11. The system according to claim 7, further comprising:

an asymmetry measurement period configuration module, configured to configure an asymmetry measurement period; and wherein, the asymmetry measurement integrated circuit module is configured to measure and calculate the value of the asymmetry delay of the 1588 uplink and downlink periodically according to the asymmetry measurement period configured by the asymmetry measurement period configuration module.

* * * * *